United States Patent
Carver et al.

(10) Patent No.: US 8,630,384 B2
(45) Date of Patent: Jan. 14, 2014

(54) CONTAINER AND METHOD FOR STORING OR TRANSPORTING SPENT NUCLEAR FUEL

(75) Inventors: George Carver, Norcross, GA (US);
Andy Langston, Alpharetta, GA (US);
Michael Yaksh, Lilburn, GA (US);
Gerald Jones, Duluth, GA (US)

(73) Assignee: NAC International, Inc., Norcross, GA (US)

( * ) Notice: Subject to any disclaimer, the term of this patent is extended or adjusted under 35 U.S.C. 154(b) by 1088 days.

(21) Appl. No.: 10/795,879

(22) Filed: Mar. 8, 2004

(65) Prior Publication Data

US 2005/0117687 A1 Jun. 2, 2005

Related U.S. Application Data

(60) Provisional application No. 60/535,884, filed on Jan. 12, 2004, provisional application No. 60/510,385, filed on Oct. 10, 2003.

(51) Int. Cl.
*G21C 19/00* (2006.01)
*G21C 19/06* (2006.01)
*G21F 5/12* (2006.01)

(52) U.S. Cl.
USPC ...... 376/272; 376/260; 250/506.1; 250/507.1

(58) Field of Classification Search
USPC ............ 367/272; 250/506.1, 507.1; 376/272, 376/285; 211/60.1, 133, 71, 182
See application file for complete search history.

(56) References Cited

U.S. PATENT DOCUMENTS

| | | | | |
|---|---|---|---|---|
| 3,231,289 A | * | 1/1966 | Carrell | 277/632 |
| 3,350,828 A | * | 11/1967 | Russell | 52/395 |
| 3,711,902 A | * | 1/1973 | Eggert, Jr. | 24/287 |
| 3,731,101 A | | 5/1973 | Peterson et al. | 250/106 |
| 4,034,227 A | * | 7/1977 | Soot | 376/272 |
| 4,063,999 A | | 12/1977 | Wade | 176/28 |
| 4,088,897 A | | 5/1978 | Soot | 250/507 |
| 4,096,392 A | | 6/1978 | Rubinstein et al. | 250/507 |
| 4,143,276 A | | 3/1979 | Mollon | 250/507 |
| 4,177,386 A | | 12/1979 | Wachter et al. | 250/507 |
| 4,288,699 A | * | 9/1981 | van der Vlis et al. | 376/272 |
| 4,319,960 A | | 3/1982 | Larson et al. | 376/272 |
| 4,399,366 A | | 8/1983 | Bucholz | 250/507.1 |
| 4,400,344 A | | 8/1983 | Wachter et al. | 376/272 |

(Continued)

FOREIGN PATENT DOCUMENTS

| | | |
|---|---|---|
| FR | 2482354 | 11/1981 |
| WO | WO 00/72326 | 11/2000 |

OTHER PUBLICATIONS

Catalog Hoover Fence Co. www.hooverfence.com.*
Wooden house with examiner official notice.*

(Continued)

*Primary Examiner* — Johannes P Mondt
(74) *Attorney, Agent, or Firm* — Thomas | Horstemeyer, LLP (57) ABSTRACT

Disclosed are apparatus and methods for storing or transporting spent nuclear fuel. In one embodiment, a container for storing spent nuclear fuel comprises a plurality of elongated tubes that receives spent nuclear fuel rods. Each tube has four sidewalls and four corners defining a rectangular cross section. The plurality of tubes is arranged in an alternating pattern. An attachment means attaches together the plurality of tubes at the corners so that two adjacent sidewalls of adjacent tubes are substantially aligned.

26 Claims, 10 Drawing Sheets

(56) References Cited

U.S. PATENT DOCUMENTS

| | | | |
|---|---|---|---|
| 4,615,278 A * | 10/1986 | Cabrelli | 108/192 |
| 4,630,738 A * | 12/1986 | Bosshard | 211/60.1 |
| 4,637,323 A * | 1/1987 | Nicely | 108/107 |
| 4,652,422 A | 3/1987 | Vogt et al. | |
| 4,666,659 A | 5/1987 | Lusk et al. | 376/272 |
| 4,695,424 A * | 9/1987 | Flynn | 376/272 |
| 4,770,844 A * | 9/1988 | Davis, Jr. | 376/272 |
| 4,781,883 A | 11/1988 | Daugherty et al. | 376/272 |
| 4,800,283 A | 1/1989 | Efferding | 250/507.1 |
| 4,803,042 A | 2/1989 | Gilmore et al. | 376/272 |
| 4,827,139 A | 5/1989 | Wells et al. | 250/507 |
| 4,857,263 A | 8/1989 | Machado et al. | 376/272 |
| 4,889,680 A | 12/1989 | Wachter | 376/261 |
| 4,930,650 A | 6/1990 | Wells | 220/21 |
| 4,948,553 A * | 8/1990 | Machado et al. | 376/272 |
| 4,960,560 A * | 10/1990 | Machado et al. | 376/272 |
| 5,032,348 A | 7/1991 | Blum et al. | 376/272 |
| 5,114,666 A | 5/1992 | Ellingson et al. | 376/272 |
| 5,121,849 A | 6/1992 | Ellingson et al. | 220/248 |
| 5,131,868 A * | 7/1992 | Forterre | 439/582 |
| 5,245,641 A | 9/1993 | Machado et al. | 376/272 |
| 5,361,281 A | 11/1994 | Porowski | 376/272 |
| 5,384,813 A | 1/1995 | Loftis et al. | 376/272 |
| 5,550,882 A | 8/1996 | Lehnert et al. | 376/272 |
| 5,881,120 A | 3/1999 | Chanzy et al. | 376/272 |
| 5,909,475 A | 6/1999 | Wells et al. | 376/272 |
| 6,009,136 A * | 12/1999 | Loftis et al. | 376/272 |
| 6,064,710 A | 5/2000 | Singh | 376/272 |
| 6,256,363 B1 | 7/2001 | Methling et al. | 376/272 |
| 6,393,086 B1 * | 5/2002 | Iacovino et al. | 376/272 |
| 6,778,625 B2 * | 8/2004 | Ohsono et al. | 376/272 |
| 2002/0015614 A1 * | 2/2002 | Lindsay | 403/230 |

OTHER PUBLICATIONS

Hoover Fence Co. catalog, Newton Falls , OH, Jun. 1999; www.hooverfence.net/—26k.*

"Catalog Hoover Fence Co", catalog, Newton Falls, OH, Jun. 1999. www.hooverfence.com.*

"Wooden house"with examiner official notice.*

Minitec Profil System: Links and Hinges www.minitecframing.com/PDF/Links%20&%20Hinges%20MiniTec332.pdf -.*

* cited by examiner

CONTAINER AND METHOD FOR STORING OR TRANSPORTING SPENT NUCLEAR FUEL

CROSS-REFERENCE TO RELATED APPLICATIONS

This application claims priority to U.S. provisional application entitled, "Container and Method for Storing Spent Nuclear Fuel", having Ser. No. 60/535,884, filed Jan. 12, 2004, and U.S. provisional application entitled "Storage Container for Storing Spent Nuclear Fuel," having Ser. No. 60/510,385, filed Oct. 10, 2003, which is entirely incorporated herein by reference.

TECHNICAL FIELD

The present invention relates to containers for storing or transporting spent nuclear fuel.

BACKGROUND

Typically, spent nuclear fuel discharged from fission reactors is stored in deep pools filled with water to dissipate heat and to attenuate the gamma and neutron radiation generated by the fuel. This is called a wet storage system. An alternative method to storing the spent nuclear fuel is a dry storage system that uses a horizontal or vertical configuration having either a heavy wall protected vessel referred to as a cask or over-pack, or a thin walled vessel called a canister. Dry storage systems can also be used to transport spent fuel between storage locations. For dry storage system, the canister can be separately placed into the cask or over-pack.

The structure that provides support for the spent nuclear fuel for dry storage and transportation systems is referred to as a fuel basket. The fuel baskets are designed to meet the compressive loads criteria contained within regulations, codes, and standards, particularly conditions for storing and transporting nuclear spent fuel. Dry storage and transportation basket designs include a tube and disk flux trap configuration, an egg crate interlocking plate configuration, a developed cell configuration and a stacked tube configuration.

SUMMARY

Disclosed are apparatus and methods for making a container that stores spent nuclear fuel. In one embodiment, among others, a container for storing spent nuclear fuel comprises a plurality of elongated tubes that receives spent nuclear fuel rods. Each tube has four sidewalls and four corners defining a rectangular cross section. The plurality of tubes is arranged in an alternating pattern. An attachment means attaches together the plurality of tubes at the corners so that two adjacent sidewalls of adjacent tubes are substantially aligned.

In another embodiment, a container for storing spent nuclear fuel comprises a plurality of tubes, a plurality of first rods, and one or more pins. The plurality of tubes receives spent nuclear fuel assemblies. The plurality of first rods has openings and is mounted on the plurality of tubes. The first rods are aligned so that one or more pins extend through the openings of the first rods linking the tubes together.

In another embodiment, a container for storing or transporting spent nuclear fuel comprises a plurality of tubes and a plurality of first rods. The plurality of tubes receives nuclear spent fuel assemblies and the tubes are adjacent to each other. The plurality of tubes has a plurality of recesses that receives the plurality of first rods. Some of the plurality of first rods mounted in the recesses of the adjacent tubes are attached to others of the plurality of first rods linking the tubes together.

In another embodiment, a container for storing spent nuclear fuel comprises a plurality of elongated tubes and a plurality of first rods. The plurality of elongated tubes receives spent nuclear fuel rods. Each tube has four sidewalls and four corners defining a rectangular cross section. The plurality of tubes is arranged in an alternating pattern. The tubes have a plurality of recesses and a plurality of flat bearing surfaces along at least one corner of the tubes. The plurality of first rods is mounted in the plurality of recesses at the corners of the plurality of the tubes. Some of the plurality of first rods mounted on the adjacent tubes are attached to others of the plurality of first rods linking the tubes together. The plurality of the tubes is linked at the corners such that the plurality of flat bearing surfaces of the adjacent tubes engages each other and the two adjacent sidewalls of the adjacent tubes are aligned.

The invention can also be construed as providing an attachment mechanism for a tube assembly that stores or transport spent nuclear fuel. The attachment mechanism includes one or more pins and a plurality of first rods being mounted on a plurality of tubes. The first rods have openings and are aligned so that the one or more pins extend through the openings of the plurality of first rods.

Further, the invention can be construed as providing a method of making a container for storing or transporting spent nuclear fuel. Such a method can be broadly summarized by the following steps: forming one or more recesses on a plurality of tubes, mounting a plurality of first rods in the recesses of the plurality of tubes, placing the plurality of tubes adjacent to each other, aligning the plurality of first rods, and inserting one or more pins through the aligned openings of the plurality of first rods to link the plurality of tubes.

Other apparatus, methods, features, and advantages of the present disclosure will be apparent to one skilled in the art upon examination of the following drawings and detailed description. It is intended that all such additional apparatus, methods, features, and advantages be included within this description and be protected by the accompanying claims.

BRIEF DESCRIPTION OF THE DRAWINGS

The disclosed apparatus and methods can be better understood with reference to the following drawings. The components in the drawings are not necessarily to scale.

DETAILED DESCRIPTION

Disclosed are apparatus and methods for a container that stores or transport spent nuclear fuel. The apparatus and methods can be used in both the wet and dry storage or transportation systems. In particular, the spent nuclear fuel is stored in a container that includes a plurality of tubes being adjacent to each other. Exemplary containers are discussed with reference to the figures. Although the exemplary containers are described in detail, they are provided for purposes of illustration only and various modifications are feasible. After the exemplary containers have been described, examples of operation are provided to explain the manner in which the containers are made.

Figure 1:
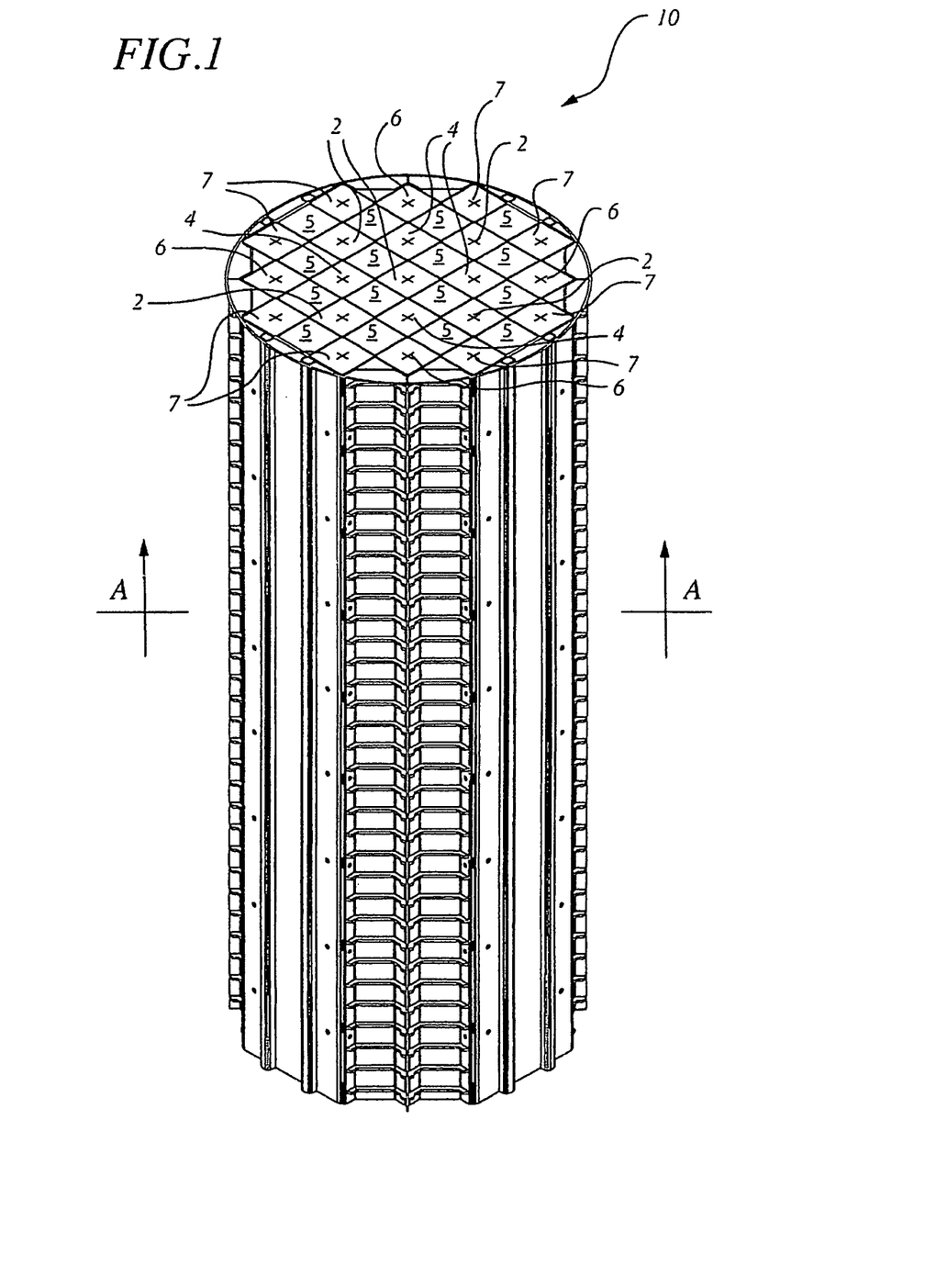
FIG. 1 is a perspective view of an embodiment of a container with the tube assembly inside the container.

Referring now in more detail to the figures in which like reference numerals identify corresponding parts, FIG. 1 is a perspective view of an embodiment of a container 10 with a tube assembly inside the container 10 that stores spent nuclear fuel. As indicated in this figure, the container 10 includes a plurality of elongated tubes 2, 4, 6, 7 that links together to form a tube assembly. The elongated tubes 2, 4, 6, 7 include four sidewalls and four corners that can be arranged to form a square-like or rectangular-like cross section. In alternative embodiments, the tubes can be arranged in other geometric shapes, e.g., circle, triangle, heptagon, hexagon and octagon.

The tubes are mounted with first rods (not shown) or second rods (not shown) or both. Preferably, the first rods are cylindrical and have openings that are located about the center diameter and along the length of the first rods. The second rods are cylindrical and have no openings. The first rods enable the tubes 2, 4, 6, 7 to be linked together. The first rods and the second rods facilitate horizontal design load transfer through the tube assembly and provide structural stability during the tube assembling and handling activities. In an alternative embodiment, the first rods and second rods can be in other geometric shapes, e.g., triangle, hexagon, and octagon. The first rods and second rods are further discussed with reference to FIGS. 2-7.

Referring to FIG. 1, the tubes are referenced differently because the tubes 2 are mounted with the first rods and second rods at the four corners of the tubes 2. The tubes 4 are mounted with the first rods at the corners of the tubes 4 but are not mounted with the second rods. The tubes 6 are mounted with the first rods and second rods at the three corners that are adjacent to the tubes 4, 7. The fourth corners of the tubes 6 that are adjacent to the wall of the container 10 are not mounted with the first rods and second rods. The tubes 7 are mounted with the first rods and second rods at the two corners that are adjacent to tubes 2, 6. The other two corners of the tubes 7 are not mounted with the first rods and second rods. The first and second rods are preferred to be mounted in recesses at the corners of one tube and engage the recesses of the adjacent tube. The recesses and rods are further discussed with reference to FIGS. 5-7.

Referring to FIG. 1, the tubes 2, 4, 6, 7 are linked at the corners of the tubes in alternating patterns to form a developed cell 5. Alternatively, the tubes 2, 4, 6, 7 can be linked in series along a row or column wherein the sidewalls of the tubes 2, 4, 6, 7 are adjacent to each other. Alternatively, if the tubes are in another geometric shape, e.g., a hexagon, the tubes can be linked to form a honeycomb-shaped tube assembly wherein the sidewalls of the tubes are adjacent to each other.

Figure 2:
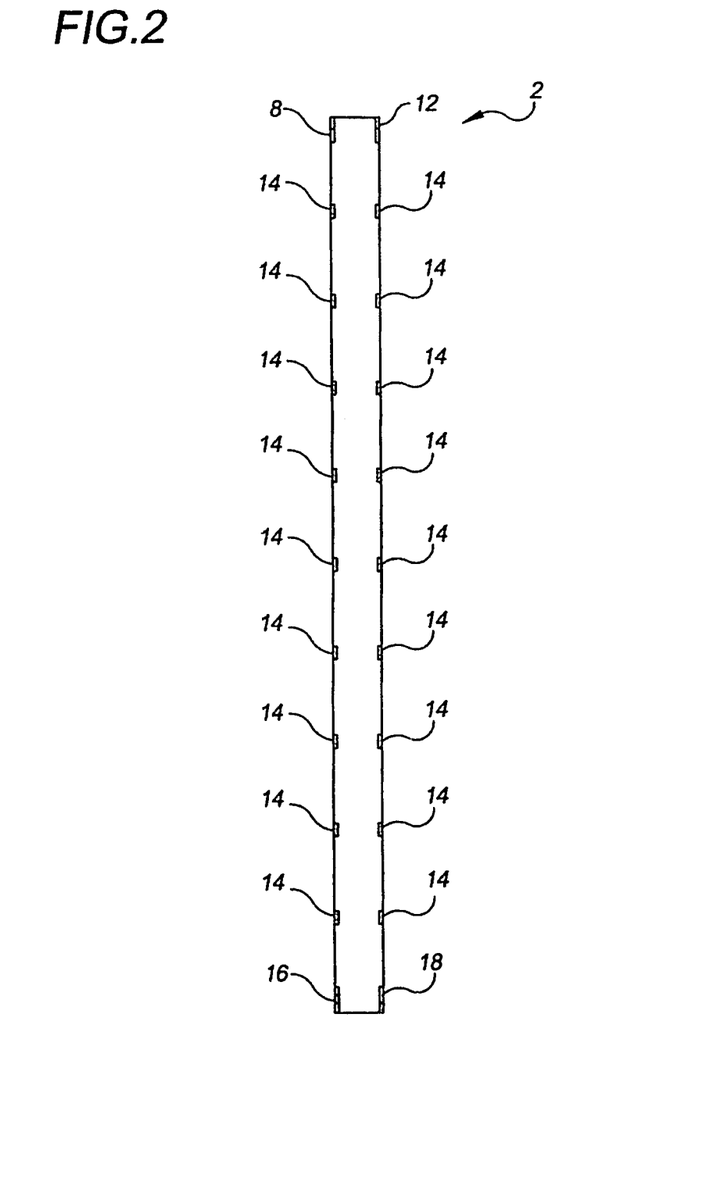
FIG. 2 is a side view of an embodiment of tube 2 shown in FIG. 1.

FIG. 2 is a side view of the tube 2 shown in FIG. 1. The tube 2 includes first rods 8, 12, 16, 18. It should be noted that the tube 2 has four more first rods on the other side of the tube 2 that are not shown. Thus, the tube 2 includes four first rods adjacent to the top corners of the tube 2 and four first rods adjacent to the bottom corners of the tube 2. The tube 2 further includes at least one second rod 14 between the top and bottom corners of the tube 2. For example, sixteen second rods 14 are mounted along the two corners of the tube 2 shown in FIG. 2. The two corners of the tube 2 not shown in FIG. 2 can be mounted with second rods 14, sixteen in this example. The first and second rods are preferred to be mounted in the recesses at the corners of the tube 2 and engage the recesses at the corners of the adjacent tubes 4, 7.

Figure 3:
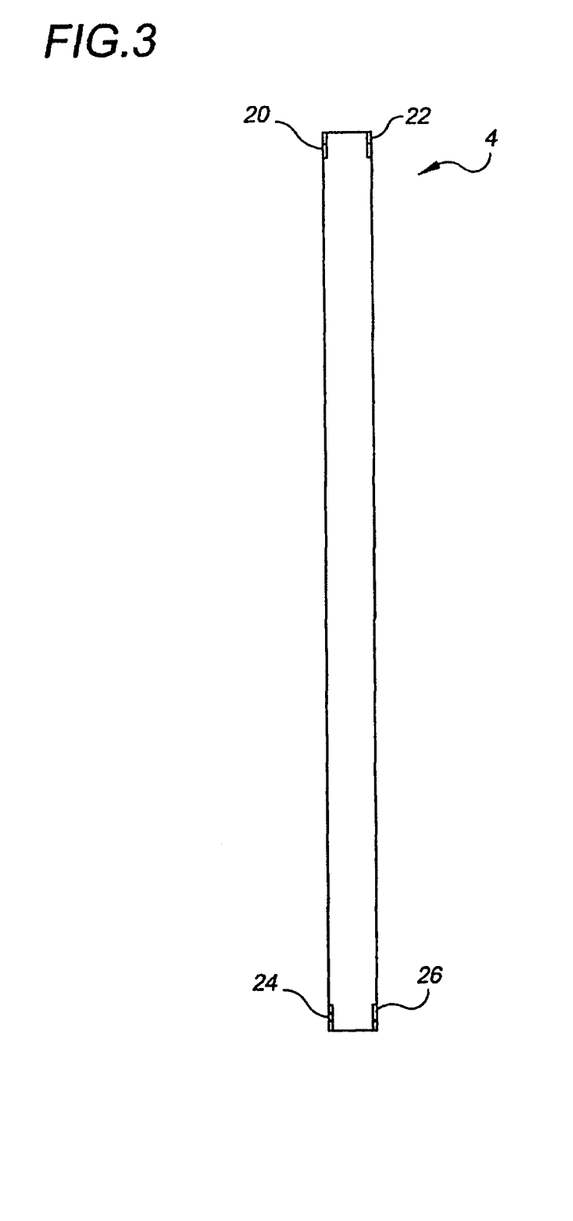
FIG. 3 is a side view of an embodiment of tube 4 shown in FIG. 1.

FIG. 3 is a side view of the tube 4 shown in FIG. 1. The tube 4 includes first rods 20, 22, 24, 26. It should be noted that the tube 4 has four more first rods on the other side of the tube 4 that are not shown. Thus, the tube 4 includes four first rods adjacent to the top corners of the tube 4 and four first rods adjacent to the bottom corners of the tube 4. The tube 4 does not include any second rods between the top and bottom corners of the tube 4. The first rods are preferably mounted in the recesses adjacent to the top and bottom corners of the tube 4. The recesses along the corners of the tube 4 engage the first and second rods mounted on the adjacent tubes 2, 6.

The tubes 6, 7 are not shown in the FIGS. 2 and 3. However, it should be noted that the tube 6 includes first rods at the three corners adjacent to the tubes 4, 7. The tube 6 includes three first rods adjacent to the top corners of the tube 6 and three first rods adjacent to the bottom corners of the tube 6. The tube 6 further includes second rods 28 (shown in FIG. 4) along the three corners of the tube 6. The fourth corner of the tube 6 that is adjacent to the wall of the container 10 is not mounted with any first and second rods. The first and second rods are preferred to be mounted in the recesses at corners of the tube 6 and engage the recesses at the corners of the adjacent tubes 4, 7.

The tube 7 includes first rods at the two corners adjacent to the tubes 2, 6. The tube 7 includes two first rods adjacent to the top corners of the tube 7 and two first rods adjacent to the bottom corners of the tube 7. No first rods are mounted on the two corners of the tube 7 that are not adjacent to the tubes 2, 6. Further, no second rods are mounted on the tube 7. The first rods are preferred to be mounted in the recesses adjacent to the top and bottom corners of the tube 7. The recesses along the corners of the tube 7 engage the first and second rods mounted on the adjacent tubes 2, 6.

In an alternative embodiment, the first rods can be mounted not only at the corners adjacent to the top and bottom of the tubes 2, 4, 6, 7 but anywhere along the corners of the tubes. The first rods can further be mounted on the sidewalls of the tubes. In addition, the second rods can be mounted on any tubes 2, 4, 6, 7, and anywhere along the corners of the tubes and/or to the sidewalls of the tubes.

Figure 4:
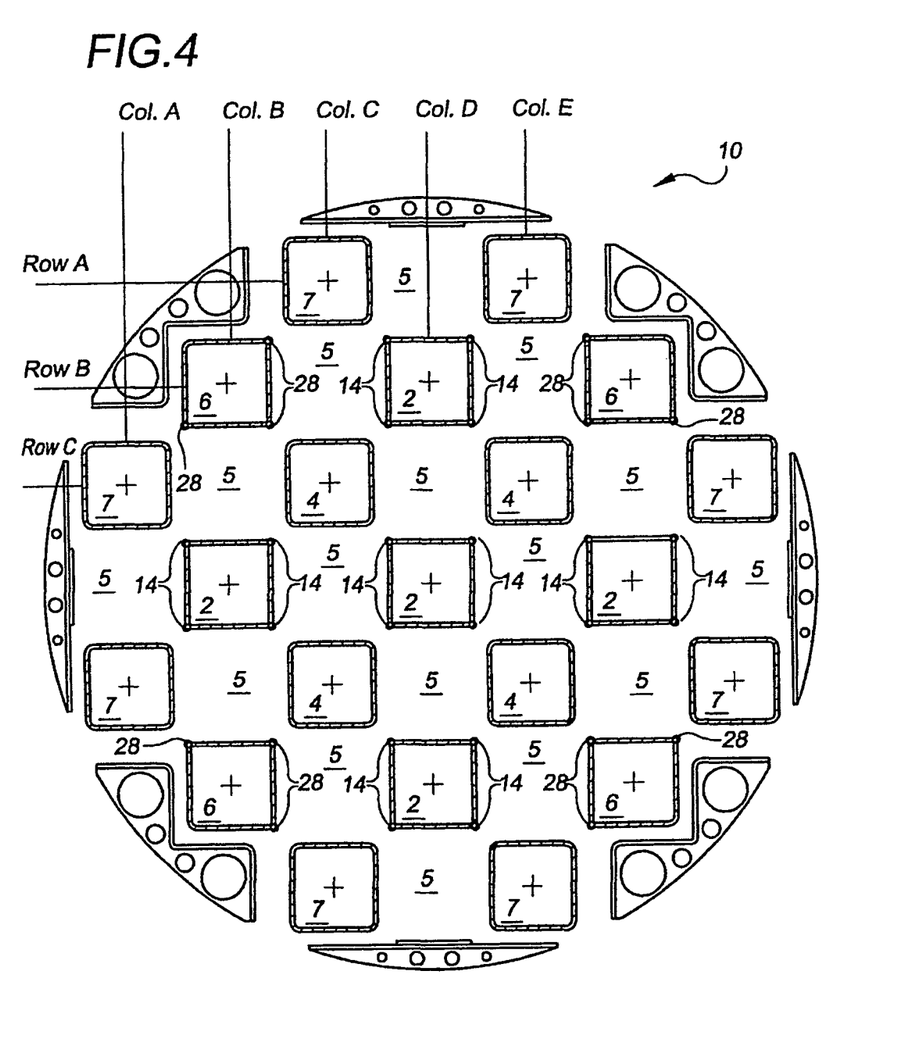
FIG. 4 is an exploded cross section view along line AA of the container shown in FIG. 1.

FIG. 4 is an exploded cross section view along line AA of the container 10 shown in FIG. 1 having a plurality of tubes 2, 4, 6, 7. The tubes are not adjacent to each other to illustrate the tubes mounted with and without second rods. The tubes 2 include one or more second rod 14 at the corners of the tube 2. The tubes 4, 7 do not include any second rods at the corners of the tubes 4. The tubes 6 include one or more second rod 28 at three corners of the tubes 6. The fourth corners of tubes 6 adjacent to the wall of the container 10 do not include any second rods. In short, one set of tubes 4, 7 are not mounted with second rods and the other set of tubes 2, 6 are mounted with second rods. When the tubes are linked together to form a tube assembly, the second rods mounted on the tubes 2, 6 engage the corners of the tubes 4, 7. Preferably, the second rods are mounted in the recesses of the tubes 2, 6 and engage the recesses of the tubes 4, 7 when the tubes are linked together.

In an alternative embodiment, the second rods can be mounted on any of the tubes 2, 4, 6, 7 anywhere along the corners of the tubes. For example, the second rod is mounted on a first tube at a first location along the corner of the first tube. Another second rod is mounted on a second tube at a second location along the corner of the second tube. When the first tube and the second tube are linked together, the second rod mounted at the first location engages the corner of the second tube and the other second rod mounted at the second location engages the corner of the first tube.

Preferably, the tubes 2, 4, 6, 7 are arranged in alternating patterns to be linked at the corners of the tubes 2, 4, 6, 7 creating a developed cell 5. For example, the tube 4 in column C, row C is adjacent at two corners to a corner of the tube 6 in column B, row B and to a corner of the tube 2 in column D, row B. The tube 7 in column C, row A is adjacent at two corners to another corner of the tube 6 and to another corner of the tube 2. This arrangement of the tubes can be linked together at the corners of the tubes 2, 4, 6, 7 to create the developed cell 5 in column C, row B. The linking of the tubes is further discussed with reference to FIGS. 5-7.

In an alternative embodiment, the tubes 2, 4, 6, 7 can be arranged such that the sidewalls of the tubes 2, 4, 6, 7 are adjacent to each other. For example, the tubes can be arranged in series along a row or a column in the container 10. Referring to FIG. 4, the tube 7 in column C, row A can be adjacent to another tube (not shown) in column D, row A, which in turn is adjacent to the tube 7 in column E, row A. In another example, the tubes can be in a hexagonal shape in which the tubes can be linked to form a honeycomb-shaped tube assembly wherein the sidewalls of the tubes are adjacent to each other. In both examples, the first rods linking the tubes 2, 4, 6, 7 can be mounted on the corners or the sidewalls of the tubes.

Figure 5:
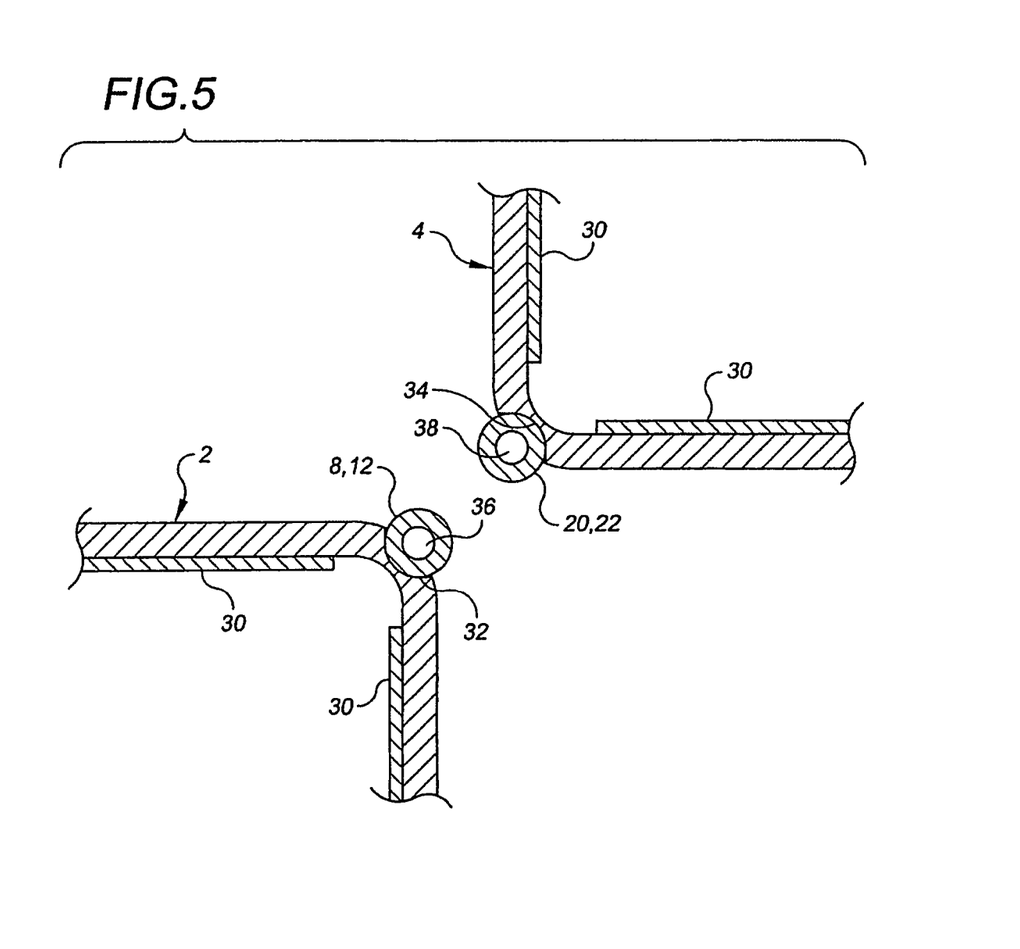
FIG. 5 is a partial top view of an embodiment of adjacent tubes in the container shown in FIG. 1.

FIG. 5 is a partial top view of the tubes 2, 4. The tubes 2, 4 include one or more poison materials 30 that are attached to the inner sidewalls of the tubes 2, 4. A recess 32 is formed at the corner adjacent to the top of the tube 2 and a recess 34 is formed at the corner adjacent to the top of the tube 4. The recesses 32, 34 are mounted with first rods 8, 12, 20, 22. The first rod 8, 12 is mounted in the recess 32 of the tube 2 slightly above the first rod 20, 22 mounted in the recess 34 of the tube 4 such that the openings 36, 38 of the first rods 8, 12, 20, 22 are axially aligned. A pin (not shown) is inserted through the openings 36, 38 of the first rods 8, 12, 20, 22 of the adjacent tubes 2, 4 to link the tubes together. The first rod 8, 12 of the tube 2 engages the recess 34 of the tube 4 and the first rod 20, 22 of the tube 4 engages the recess 32 of the tube 2. The first-rod-and-pin arrangement is further discussed with reference to FIGS. 6 and 7.

It should be noted that the bottom corners of the tubes 2, 4 include the features that were mentioned above with reference to FIG. 5. For example, first rods 16, 18, 24, 26 are mounted in the recesses formed adjacent to the bottom corners of the tubes 2, 4. The first rod 16, 18 is mounted in the recess 46 of the tube 2 slightly above the first rod 24, 26 mounted in the recess 48 of the tube 4 such that the openings 52, 54 of the first rods 16, 18, 24, 26 are axially-aligned. A pin is inserted through the openings 52, 54 of the first rods 16, 18, 24, 26 of the adjacent tubes 2, 4 to link the tubes together. The first rod 16, 18 of the tube 2 engages the recess 48 of the tube 4 and the first rod 24, 26 of the tube 4 engages the recess 46 of the tube 2. It should be noted that tubes 2 are further linked to the adjacent tubes 7 and tubes 4 are further linked to adjacent tubes 6 in the same manner as described above.

In addition, the tubes 6, 7 (not shown in FIG. 5) include the features that were mentioned above with reference to FIG. 5. The tube 6 includes recesses at the three corners adjacent to the tubes 4, 7. Preferably, three first rods are mounted in the recesses at the three corners adjacent to the top of the tube 6 and three first rods are mounted in the recesses at the three corners adjacent to the bottom of the tube 6. The fourth corner of the tube 6 that is adjacent to the wall of the container 10 does not include any recesses and first rods. The first rods of the tubes 6, 4, 7 include openings that can be axially aligned so that a pin extends through the openings of the first rods linking the tube 6 to the adjacent tubes 4, 7 together.

The tube 7 includes recesses at two corners adjacent to the tubes 2, 6, preferably two first rods are mounted in the recesses at the two corners adjacent to the top of the tube 7 and two first rods are mounted in the recesses at the two corners adjacent to the bottom of the tube 7. The other two corners not adjacent to the tubes 2, 6 do not include any recesses and first rods. The first rods of the tubes 2, 6, 7 include openings that can be axially aligned so that a pin extends through the openings of the first rods linking the tubes 7 to the adjacent tubes 2, 6 together.

The recesses can be formed anywhere along the corners of the tubes 2, 4, 6, 7 and can be mounted with first rods and/or second rods. Preferably, the recesses adjacent to the top and bottom corners of the tubes 2, 4, 6, 7 are mounted with the first rods as mentioned above. The recesses between the top and bottom corners of the tubes 2, 6 receives the second rods 14, 28. When the tubes 2, 4, 6, 7 are linked together, the second rods 14, 28 mounted on the tubes 2, 6 engage the recesses of the tubes 4, 7.

By coupling the first rods and second rods in the recesses, the sidewalls of the tubes can be aligned in a substantially straight line to the sidewalls of the tubes. This enables the tube assembly to distribute the horizontal bearing load transfer through the sidewalls of the tubes to the container walls. An advantage, among others, is that the distribution of load to the sidewalls decreases the use of welding and tube wall materials needed to bear the large compressive loads set forth in the regulations and codes for spent nuclear fuel containers. The distribution of the load to the sidewalls eliminates the stress and high moments directly on the welds that could be used to join the adjacent tubes because the sidewalls, rods, and recesses transmit the compressive loads.

Preferably, the recesses are semi-circular to receive the cylindrical shaped first and second rods. In an alternative embodiment, the recesses can be formed to receive the different geometric shapes of the first rods and the second rods. For example, if the rods are in a hexagonal shape, the recess can be formed to receive three of the six sidewalls of the hexagonal rods. In another alternative embodiment, the recesses can be formed on the sidewalls of the tubes 2, 4, 6, 7 and are mounted with first rods and/or second rods.

Figure 6:
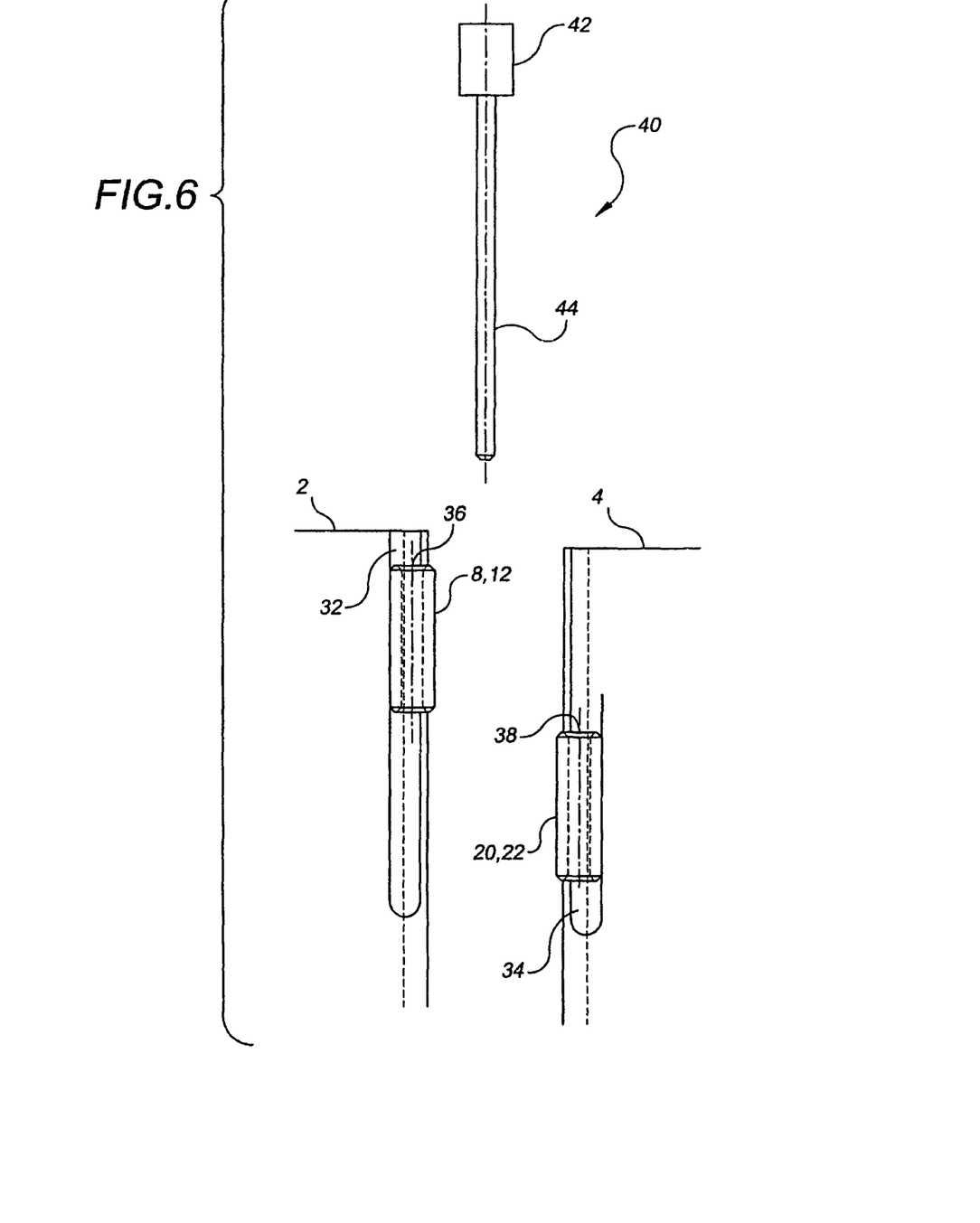
FIG. 6 is a partial side view at the top corners of an embodiment of adjacent tubes in the container shown in FIG. 1.

FIG. 6 is a partial side view that shows an attachment mechanism of the tube assembly at the top corners of the tubes 2, 4. The attachment mechanism includes first rods 8, 12, 20, 22 and a pin 40. The first rods 8, 12, 20, 22 can be mounted in the recesses 32, 34 that are formed at the corners adjacent to the top of the tubes 2, 4. The first rods 8, 12, 20, 22 are positioned along the recesses 32, 34 of the tubes 2, 4 so that the first rods can be aligned to extend the pin 40 through the openings 36, 38 of the aligned first rods to link the adjacent tubes 2, 4. The pin 40 can include a head portion 42 and a body portion 44. The body portion 44 of the pin 40 extends through openings 36, 28 of the first rods 8, 12, 20, 22. The head portion 42 is placed adjacent to the first rod 8, 12 and the recess 32 of the tube 2, and can be welded to or otherwise captured by the first rod 8, 12 and the recess 32 of the tube 2. Thus, the pin 40 may be captured by one tube, which in this example, is tube 2.

Figure 7:
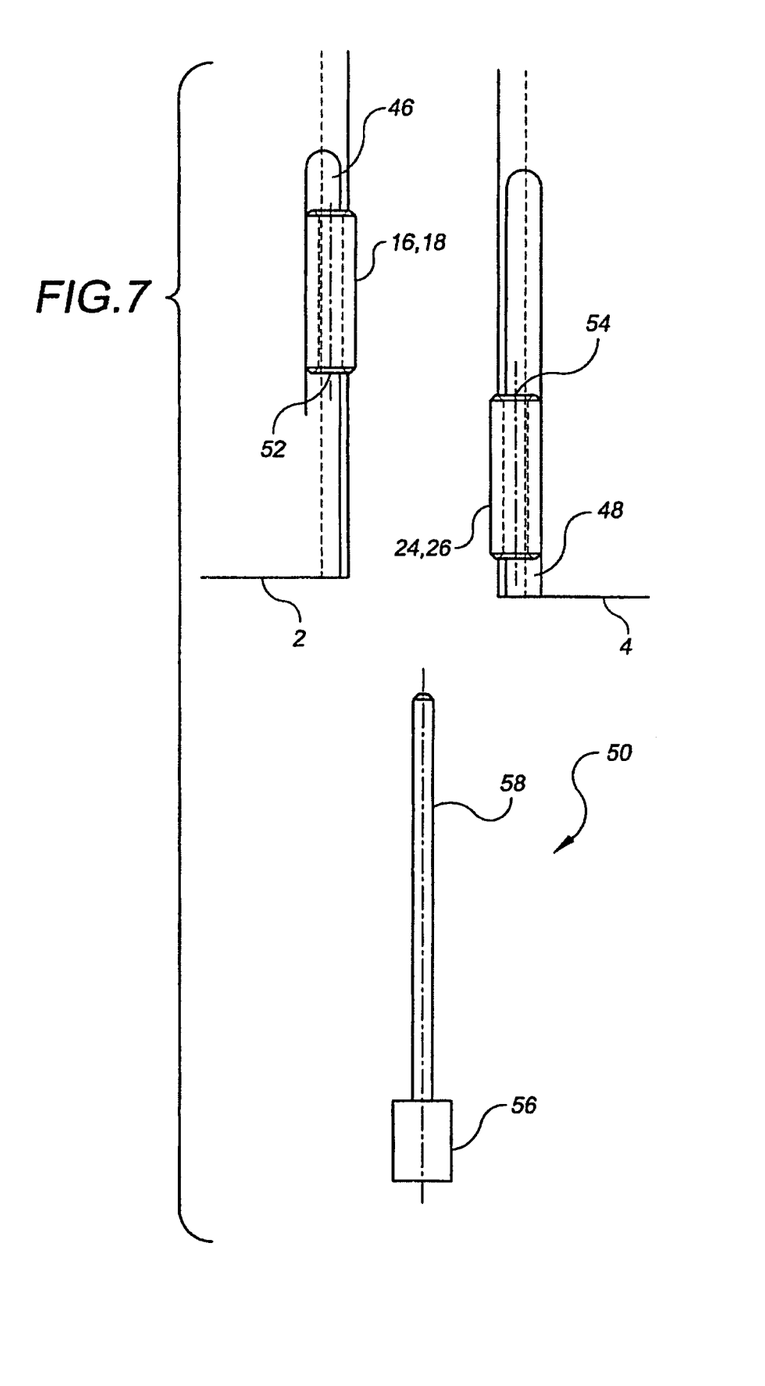
FIG. 7 is a partial side view at the bottom corners of an embodiment of adjacent tubes in the container shown in FIG. 1.

FIG. 7 is a partial side view that shows an attachment mechanism at the bottom corners of the tubes 2, 4. The attachment mechanism includes first rods 16, 18, 24, 26 and a pin 50. The first rods can be mounted in the recesses 46, 48 that are formed at the corners adjacent to the bottom of the tubes 2, 6. The first rods 16, 18, 24, 26 are positioned along the recesses 46, 48 of tubes 2, 4 so that the first rods can be aligned to extend the pin 50 through the openings 52, 54 of the aligned first rods to link the adjacent tubes 2, 4. The pin 50 can include a head portion 56 and a body portion 58. The body portion 58 of the pin 50 extends through openings 52, 54 of the first rods 16, 18, 24, 26. The head portion 56 is placed adjacent to the first rod 24, 26 and the recess 48 of the tube 4, and can be welded to or otherwise captured by the first rod 24, 26 and the recess 48 of the tube 4. Thus, the pin 50 may be captured by one tube, which in this example, is tube 4.

The attachment mechanism discussed with reference to FIGS. 6 and 7 can be placed anywhere along the corners of the tubes 2, 4 and can link the tubes to each other to form a tube assembly. The attachment mechanism facilitates horizontal bearing load transfer through the tube assembly to the container walls and provides the flexibility for linking the tubes 2, 4, 6, 7 in a continuous array across the tube assembly. Further, the tube assembly can be handled external to the container 10 as a unit rather than as individual pieces.

Figure 8:
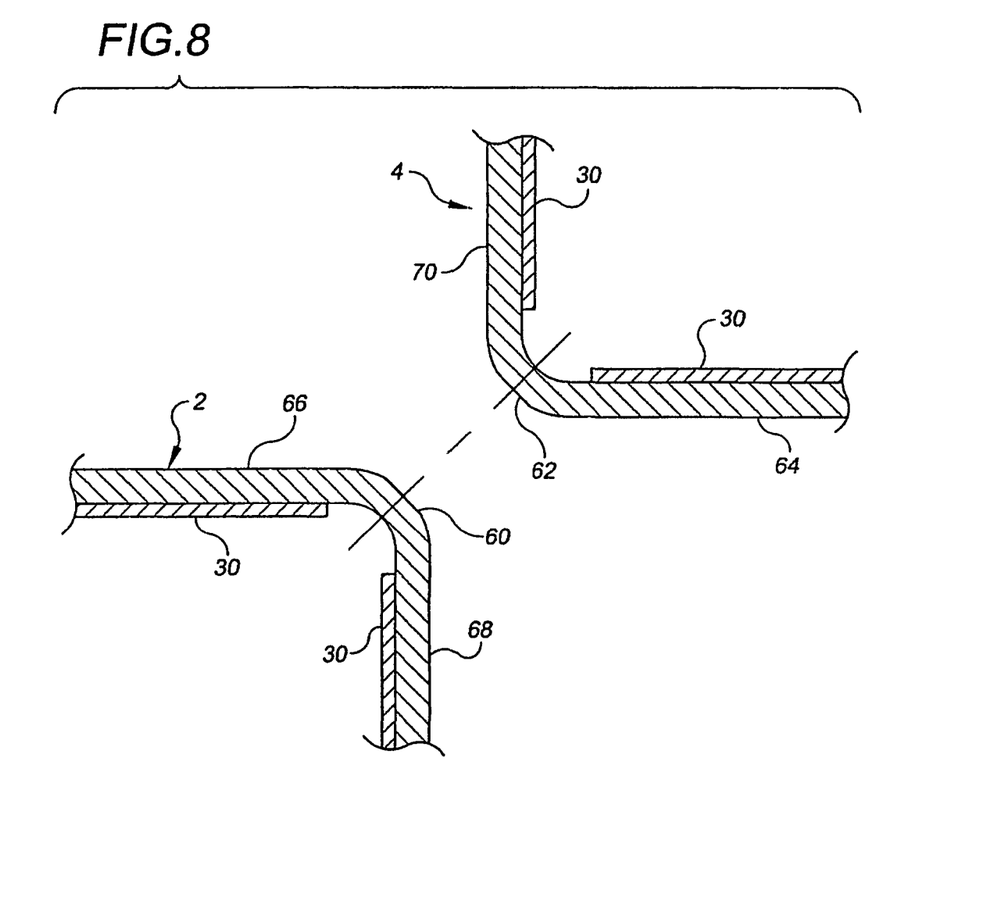
FIG. 8 is a partial cross section exploded view of adjacent tubes shown in FIG. 1 at the corners of the adjacent tubes.
Figure 9:
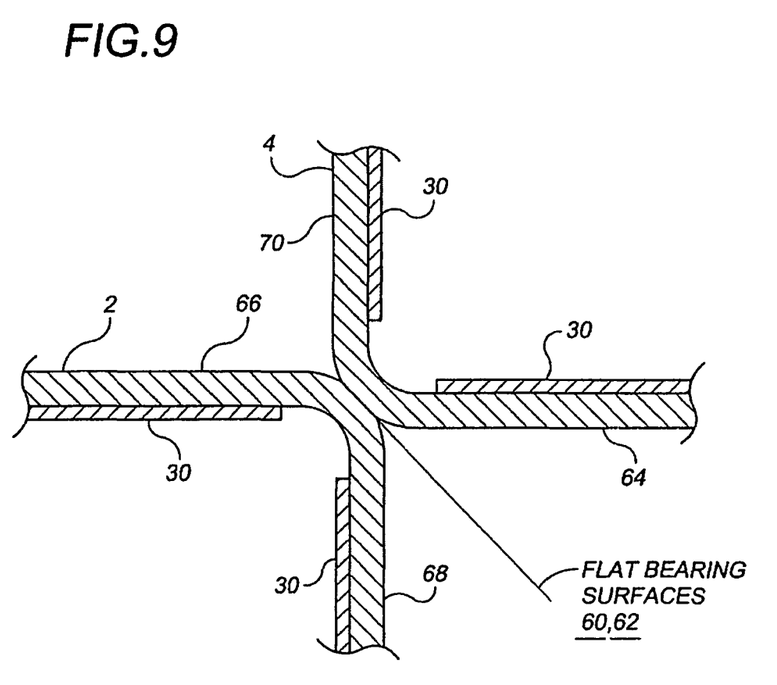
FIG. 9 is a partial cross section exploded view of adjacent tubes shown in FIG. 1 at the corners of the adjacent tubes when the tubes are linked together.

FIG. 8 is a partial cross section view of the tubes 2, 4 that includes flat bearing surfaces 60, 62 formed along the corners of the tubes 2, 4 where the recesses 32, 34, 46, 48 are not formed. The tubes are not adjacent to each other to better illustrate the flat bearing surfaces 60, 62. FIG. 9 is a partial cross section view that shows the flat bearing surface 60 of the tubes 2 engaging the flat bearing surface 62 of the tubes 4 when the tubes 2, 4 are linked.

When the tubes 2, 4 are linked together, the flat bearing surfaces 60, 62 can facilitate aligning the sidewalls of the tube 2 in a substantially straight line to the sidewalls of the tube 4. For example, sidewall 64 of the tube 4 is aligned in a substantially straight line with sidewall 66 of the tube 2. Sidewall 70 of the tube 4 is aligned in a substantially straight line with sidewall 68 of the tube 2. This facilitates horizontal bearing load transfer through the tube assembly to the container walls. It should be noted that the tubes 2, 4, 6, 7 include flat bearing surfaces at the corners of the respective tubes.

Figure 10:
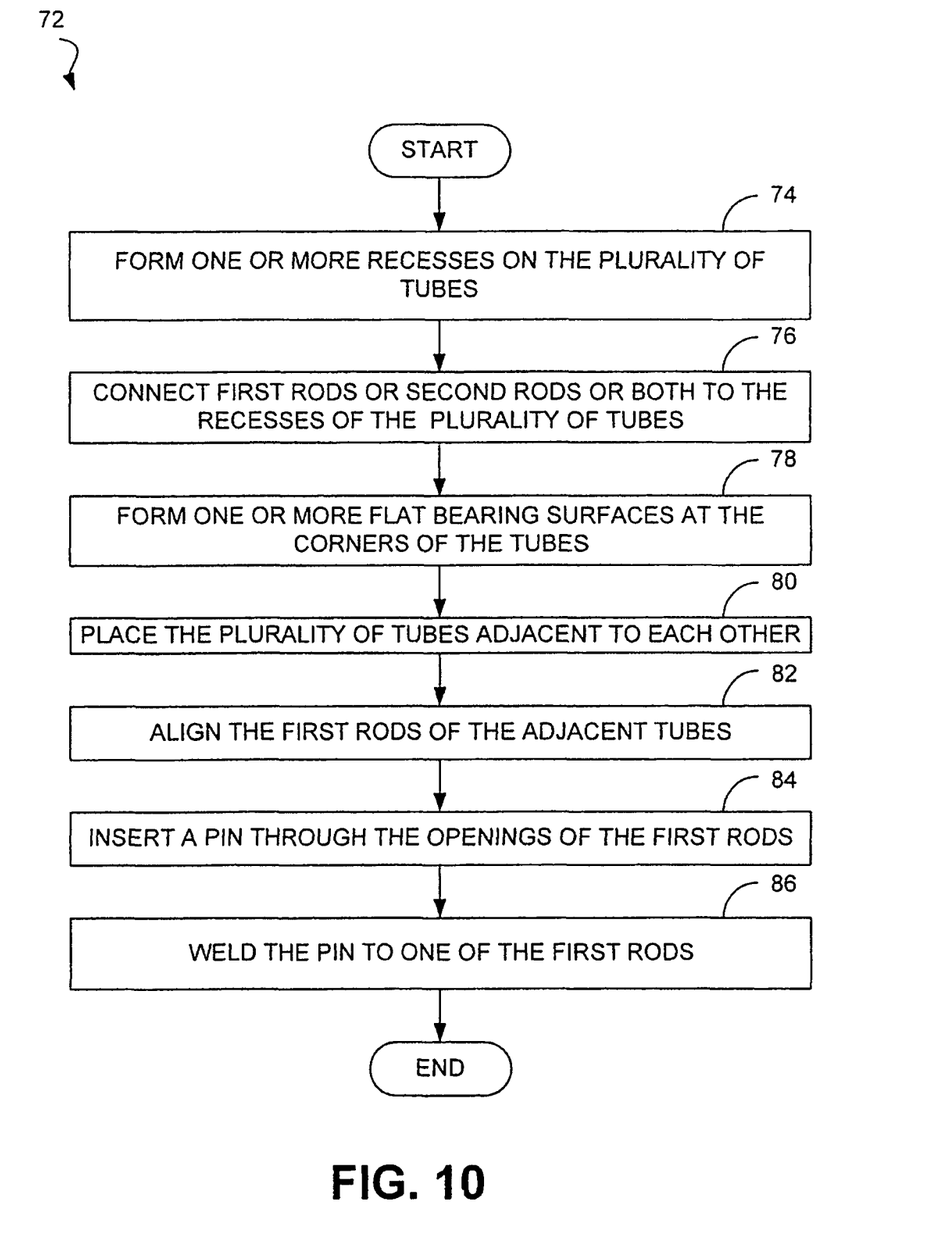
FIG. 10 is a flow diagram that illustrates an embodiment of the process of making the container.

FIG. 10 is a flow diagram that illustrates an embodiment of the process 72 of making the container for storing spent nuclear fuel. Beginning with block 74, one or more recesses are formed on the plurality of tubes, preferably at the corners of the tubes. In an alternative embodiment, the recesses can be formed on the sidewalls of the tubes.

In block 76, the recesses can be mounted with the first rods or second rods or both. Preferably, the second rods are mounted on one set of tubes and no second rods are mounted on another set of tubes. In block 78, one or more flat bearing surfaces are formed along the corners of the tubes, preferably where the recesses are not formed. The flat bearing surfaces of the tubes are adjacent and can engage each other when the tubes are linked.

In block 80, a plurality of tubes is placed adjacent to each other, preferably along the corners of the tubes such that the sidewalls of the tubes are aligned in a substantially straight line. Further, it is also preferable to place four tubes in alternating patterns to create a developed cell. In an alternative embodiment, the tubes can be arranged such that the sidewalls of the tubes are adjacent to each other. For example, if the tubes are shaped in a rectangular cross section, the rectangular tubes can be arranged in series. If the tubes are shaped in a hexagonal cross section, the hexagonal tubes can be arranged in a honeycomb formation.

In block 82, the first rods of the adjacent tubes are aligned. In block 84, one or more pins are inserted through the openings of the aligned first rods. In block 86, the pin can be welded to or otherwise captured by the first rods of one of the adjacent tubes.

It should be emphasized that the above-described embodiments of the present disclosure, particularly any "preferred" embodiments, are merely possible examples of implementations, set forth only for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure protected by the following claims.

Therefore, having thus described the invention, at least the following is claimed:

1. A container for storing or transporting spent nuclear fuel, the container comprising:
a plurality of tubes that receive spent nuclear fuel assemblies, each tube having four sidewalls and four corners defining a rectangular cross section, the four sidewalls forming a continuous inner sidewall;
an attachment means for attaching respective pairs of a plurality of corners of the tubes to each other, at least one corner of a first one of the tubes engaging another corner of a second one of the tubes, the attachment means comprising a plurality of recesses in respective ones of the corners and a plurality of rods that are positioned in the recesses between respective engaged ones of the corners, wherein each of the rods is a cylinder having a single cylindrical wall, the cylindrical wall of each of the rods contacting at least two recesses associated with at least two of the tubes;
each engaged corner of the first and second ones of the tubes being formed from an intersection of a first sidewall and a second sidewall, the first and second sidewalls being normal to each other;
the first sidewall of the first one of the tubes and the first sidewall of the second one of the tubes being in substantial alignment; and
the second sidewall of the first one of the tubes and the second sidewall of the second one of the tubes being in substantial alignment.

2. The container of claim 1, wherein each of the first rods has an opening and the attachment means further comprises at least one pin, wherein the openings of at least one respective pair of the first rods mounted in respective ones of the recesses of the first and second ones of the tubes are axially aligned, wherein the at least one pin is inserted through the openings of the at least one respective pair of the first rods.

3. The container of claim 1, wherein the rods further comprise at least one first rod and at least one second rod, the at least one first rod being mounted in a corresponding at least one of the recesses of the first one of the tubes and the at least one second rod being mounted in a corresponding at least one of the recesses of the second one of the tubes, the at least one first rod engaging a respective one of the recesses of the second one of the tubes and the at least one second rod engaging a respective one of the recesses of the first one of the tubes when the first side wall of the first one of the tubes and the first side wall of the second one of the tubes are in substantial alignment, and the second side wall of the first one of the tubes and the second side wall of the second one of the tubes are in substantial alignment.

4. The container of claim 3, further comprising a first and a second set of the tubes, wherein the second rods are mounted on the tubes within the first set, wherein each of the second rods of the first set of tubes engages a respective one of the tubes in the second set of tubes.

5. The container of claim 1, wherein the plurality of tubes is arranged in the alternating pattern such that the placement of a four-tube array linked at the corners of the tubes creates a developed cell.

6. A container for storing or transporting spent nuclear fuel, the container comprising:
   a plurality of tubes that receive spent nuclear fuel, each of the plurality of tubes having a continuous inner sidewall;
   a plurality of first rods being mounted at a point where each respective one of the tubes abuts against another one of the tubes, each of said first rods having an opening, wherein each respective one of the first rods is mounted in a recess of both a first one of the tubes and a second one of the tubes, wherein each of the rods comprises at least one outer wail, the at least one outer wall of each of the rods contacting the recesses of both the first and second ones of the tubes;
   at least one pin;
   wherein the openings of respective ones of the first rods mounted on the first one of the tubes are substantially aligned with the openings of respective ones of the first rods mounted on the second one of the tubes;
   the at least one pin extends through the aligned ones of the openings of the first rods, thereby linking respective ones of the tubes together; and
   wherein each one of the respective ones of the first rods mate with a corresponding recess in the second one of the tubes when the openings of the respective ones of the first rods mounted in the recesses in the first one of the tubes are substantially aligned with the openings of the respective ones of the first rods mounted on the second one of the tubes.

7. The container of claim 6, wherein the at least one pin is captured by one of the first rods.

8. The container of claim 6, wherein the at least one pin comprises a head portion and a body portion, the body portion extending through the openings of the aligned ones of the first rods and the head portion resting against one of the first rods.

9. The container of claim 6, further comprising a first set of tubes upon which the second rods are mounted, and a second set of tubes without second rods mounted thereon, the second rods of the first set of tubes engaging the second set of tubes when the tubes are linked together.

10. The container of claim 6, wherein each of the tubes has four sidewalls and four corners defining a rectangular cross section, the plurality of recesses being formed at the corners of the tubes.

11. The container of claim 10, wherein:
    the tubes are arranged in an alternating pattern; and
    the tubes are linked together at the corners, wherein a sidewall of a first one of the tubes is in substantial alignment with a sidewall of a second one of the tubes.

12. The container of claim 11, wherein the tubes are arranged in the alternating pattern such that the placement of a four-tube array linked at the corners of the tubes creates a developed cell.

13. A container for storing spent nuclear nucerfue, the container comprising:
    a plurality of tubes that receive spent nuclear fuel assemblies, each of the tubes having a plurality of recesses and a continuous inner sidewall;
    a plurality of first rods being mounted in respective ones of the recesses; and
    wherein at least one first rod mounted on a respective one of the tubes is attached to at least one of the first rods mounted on at least one second one of the tubes, thereby linking the respective one of the tubes and the at least one second one of the tubes together, wherein each of the first rods is seated in both a first one of the recesses of the respective one of the tubes and a second one of the recesses of the at least one second one of the tubes, and each of the rods comprises at least one outer wall, the at least one outer wall of each of the rods contacting both the first and second ones of the recesses.

14. The container of claim 13, wherein each of the first rods has an opening and respective pairs of the first rods are attached to each other by axially aligning the openings of the respective pairs of the first rods and extending a pin through the openings of each of the respective pairs of the first rods.

15. The container of claim 14, wherein the pin comprises a head portion and a body portion, the body portion extending through the openings of each of the respective pairs of the first rods and the head portion abutting against one of the first rods.

16. The container of claim 14, wherein the pin is captured by one of the first rods.

17. The container of claim 13, wherein each of the tubes has four sidewalls and four corners defining a rectangular cross section, the recesses being formed along at least one of the corners of the tubes and the first rods being mounted in the plurality of recesses along the at least one of the corners of the tubes.

18. The container of claim 17, wherein the tubes are arranged in an alternating pattern and the tubes are linked together at the corners, wherein a first one of the side walls of the first one of the tubes is substantially aligned with a first one of the side walls of the second one of the tubes, and a second one of the side wails of the first one of the tubes is substantially aligned with a second one of the side walls of the second one of the tubes.

19. The container of claim 13, further comprising at least one second rod being mounted in the recesses of respective ones of the tubes, he at least one second rod mounted in the recess of a respective one of the tubes engaging the recess of a remaining one of tubes when the tubes are linked together.

20. The container of claim 19, wherein the plurality of tubes comprises a first set of tubes and a second set of tubes, wherein the second rods are mounted in each one of the tubes in the second set of tubes.

21. The container of claim 18, wherein the plurality of tubes is arranged in the alternating pattern such that the placement of a four-tube array linked at the corners of the tubes creates a developed cell.

22. An apparatus for the storage and transport of spent nuclear fuel, comprising:
    an array of tubes having a continuous inner sidewall;
    a container, wherein the array of tubes are disposed in the container and the array of tubes contacts at least one side wall of the container;
    a plurality of couplings between adjacent pairs of the tubes, wherein each of the couplings comprises:
    a first rod disposed on a first one of the tubes;
    a second rod attached to a second one of the tubes;
    the first rod being disposed in recesses formed in the outer surfaces of both the first and second ones of the tubes, and the second rod being disposed in the recesses formed in the outer surfaces of both the first and second ones of the tubes, wherein each of the first and second rods comprises at least one outer wall, the at least one outer wall of each of the first and second rods contacting the recesses formed in the outer surfaces of both the first and second ones of the tubes;

the first and second rods each having an opening along a length of the first and second rods; and a pin extending through the openings of the first and second rods; and wherein a horizontal bearing load applied to the array of tubes is transferred through the tubes and the couplings to the at least one side wall of the container.

23. The apparatus of c aim 22, wherein each of the tubes further comprises a plurality of side walls, wherein at least one of the side walls of a respective one of the tubes and a side wall of a second one of the tubes are in substantial alignment.

24. The apparatus of claim 22, wherein the recesses are formed in a plurality of corners in the outer surfaces of the tubes.

25. The apparatus of claim 22, wherein a cross sectional shape of the tubes is selected from the group consisting of a square, a rectangle, a circle, a triangle, a hexagon, a heptagon, and an octagon.

26. The apparatus of claim 22, wherein the array of tubes forms a cell, wherein the tubes are arranged in an alternating pattern in the cell.

* * * * *